US011384877B2

(12) United States Patent
Guevel (10) Patent No.: US 11,384,877 B2
(45) Date of Patent: Jul. 12, 2022

(54) RETAINING ASSEMBLY FOR A GAS TURBINE ENGINE

(71) Applicant: UNITED TECHNOLOGIES CORPORATION, Farmington, CT (US)

(72) Inventor: Edward Guevel, West Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 747 days.

(21) Appl. No.: 16/257,917

(22) Filed: Jan. 25, 2019

(65) Prior Publication Data
US 2020/0240557 A1 Jul. 30, 2020

(51) Int. Cl.
*F16L 23/08* (2006.01)
*F02K 1/80* (2006.01)

(52) U.S. Cl.
CPC ............. *F16L 23/08* (2013.01); *F02K 1/80* (2013.01); *F05D 2220/32* (2013.01); *F05D 2260/30* (2013.01)

(58) Field of Classification Search
CPC ....... F16L 23/10; F16L 23/08; F16L 37/1205; F16L 3/02; B25B 5/006; B25B 5/147; F02C 7/222; F02K 1/80; F05D 2260/39; Y10T 29/53917; F01D 25/18; F01N 13/1805; F16B 2/20–245; F21L 15/14
See application file for complete search history.

(56) References Cited

U.S. PATENT DOCUMENTS

| 1,910,706 | A | * | 5/1933 | Malzard | F16L 33/12 |
| | | | | | 285/314 |
| 3,489,434 | A | | 1/1970 | Haley | |
| 4,191,410 | A | * | 3/1980 | Voituriez | F16L 23/10 |
| | | | | | 285/367 |
| 4,432,524 | A | * | 2/1984 | Wize | B60N 2/02 |
| | | | | | 248/395 |
| 5,226,231 | A | | 7/1993 | De Leebeeck | |

(Continued)

FOREIGN PATENT DOCUMENTS

| DE | 29519866 | 2/1996 |
| DE | 102012213640 | 2/2014 |

(Continued)

OTHER PUBLICATIONS

European Patent Office, European Partial Search Report dated Nov. 6, 2020 in Application No. 20153210.8.

(Continued)

*Primary Examiner* — Topaz L. Elliott
(74) *Attorney, Agent, or Firm* — Snell & Wilmer L.L.P.

(57) ABSTRACT

A retaining assembly may comprise a bracket assembly having a first end and a second end. The first end may be configured to mount to a clamping band. The retaining assembly may further comprise a retention component. The retention component may have a clevis coupled to the second end. The retaining assembly may be coupled to an otherwise loose external component on a gas turbine engine. The retaining assembly may keep the otherwise loose external component fixed to the gas turbine engine during maintenance operations and prevent the otherwise loose external component from being lost or misplaced.

12 Claims, 5 Drawing Sheets

(56) References Cited

U.S. PATENT DOCUMENTS

| | | | |
|---|---|---|---|
| 9,261,022 B2 * | 2/2016 | Saha | F01D 17/145 |
| 9,494,265 B2 | 11/2016 | Ghirardi et al. | |
| 9,709,198 B1 | 7/2017 | Selfridge | |
| 10,132,429 B2 * | 11/2018 | Grieb | F16L 3/21 |
| 2006/0180713 A1 * | 8/2006 | Olle | F16L 3/11 |
| | | | 248/58 |
| 2011/0253675 A1 | 10/2011 | Heller et al. | |
| 2014/0157791 A1 * | 6/2014 | Saha | F01D 25/12 |
| | | | 60/785 |
| 2015/0137505 A1 * | 5/2015 | Ford | F16L 33/04 |
| | | | 285/81 |
| 2015/0174706 A1 | 6/2015 | McClure | |
| 2016/0208706 A1 * | 7/2016 | Snape | F16M 13/02 |
| 2016/0245428 A1 * | 8/2016 | Gustin | F16L 3/02 |
| 2017/0284578 A1 * | 10/2017 | Prevot | F01N 13/1805 |

FOREIGN PATENT DOCUMENTS

| | | | | |
|---|---|---|---|---|
| EP | 0429925 | | 6/1991 | |
| EP | 2085675 B1 | * | 5/2010 | F16L 21/065 |
| EP | 2569567 B1 | * | 6/2014 | F16L 33/22 |
| FR | 2697893 A1 | * | 5/1994 | F16L 23/08 |
| GB | 2211256 A | * | 6/1989 | F16L 23/08 |
| GB | 2311480 | | 10/1997 | |
| KR | 20160124040 A | * | 10/2016 | F16L 33/22 |
| WO | WO-2017032764 A1 | * | 3/2017 | F16L 3/085 |

OTHER PUBLICATIONS

European Patent Office, European Partial Search Report dated Mar. 31, 2021 in Application No. 20153210.8.

* cited by examiner

RETAINING ASSEMBLY FOR A GAS TURBINE ENGINE

FIELD

The present disclosure relates to aircraft propulsion systems, and more particularly, to a retaining assembly for a clamp.

BACKGROUND

Jet aircraft propulsion systems, such as those that power modern commercial and military aircraft, include a variety of external components that support and/or connect one tube assembly to another. During maintenance operations of a gas turbine engine, the external components may be misplaced, lost, or dropped.

SUMMARY

A retaining assembly is disclosed. The retaining assembly may comprise a bracket assembly and a retention component. The bracket assembly may have a first end and a second end. The first end may be configured to mount to a clamping band. The retention component may have a clevis coupled to the second end.

In various embodiments, the second end and the clevis may define a fulcrum, and the bracket assembly may be able to rotate about the fulcrum. The retention component may further comprise a spring-loaded clamp. The retention component may comprise at least one of a worm gear or a fastener configured to either loosen or tighten the retention component. The retention component may comprise at least one of a chain or a band/strap. The bracket assembly may comprise a first L-bracket having a first aperture and a second L-bracket having a second aperture. The first aperture and the second aperture may be coupled to the clevis via a pin.

A clamp assembly is disclosed. The clamp assembly may comprise a clamping band, and a retaining assembly. The retaining assembly may comprise a bracket assembly and a retention component. The bracket assembly may have a first end coupled to the clamping band and a second end. The retention component may have a clevis coupled to the second end of the bracket assembly.

In various embodiments, the clevis and the second end define a fulcrum. the clamping band may able to rotate via the bracket assembly about the fulcrum. The retention component may comprise a spring loaded clip. The retention component may comprise at least one of a worm gear or a fastener configured to either loosen or tighten the retention component. The bracket assembly may comprise a first L-bracket having a first hinge aperture and a second L-bracket having a second hinge aperture. A first clamping arm of the clamping band may be coupled to the first L-bracket and configured to pivot about a first hinge and a second clamping arm of the clamping band may be coupled to the second L-bracket and configured to pivot about a second hinge. The retention component may comprise at least one of a chain or a band/strap.

A gas turbine engine is disclosed. The gas turbine engine may comprise a first tube assembly. The first tube assembly may comprise a tube and a clamp assembly. The tube may have a straight portion having an outer surface. The clamp assembly may comprise a sleeve having a semi-annular portion, a clevis, and a bracket assembly. The bracket assembly may have a first end and a second end. The sleeve may be coupled at the semi-annular portion to the outer surface of the straight portion. The bracket assembly may be coupled to the sleeve at an intersection of the second end and the clevis.

In various embodiments, the intersection defines a fulcrum about which the first end of the bracket assembly is configured to rotate. The clamp assembly may further comprise a clamping band coupled to the first end of the bracket assembly. The semi-annular portion of the sleeve may be fixedly attached via brazing to the outer surface of the straight portion of the first tube assembly. The bracket assembly may comprise a first L-bracket having a first hinge aperture and a second L-bracket having a second hinge aperture. A first clamping arm of the clamping band may be coupled to the first L-bracket and configured to pivot about a first hinge and a second clamping arm of the clamping band may be coupled to the second L-bracket and configured to pivot about a second hinge. The gas turbine engine may further comprise a second tube assembly coupled to the first tube assembly by the clamping band.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Disclosed herein is a retaining assembly configured retain a clamp assembly to a fixed tubing structure during maintenance operations of a gas turbine engine. In accordance with various embodiments, the retaining assembly may include a retention component configured to retain the clamp assembly to a tube assembly. In various embodiments, the retaining assembly may include a bracket assembly configured to couple the retention component to a clamp. In various embodiments, a clamp assembly may include the retaining assembly and be configured to connect a first tube to a second tube. Accordingly, a clamp assembly having a retaining assembly, as disclosed herein, can reduce or eliminate the possibility of misplacing or dropping a clamp assembly during maintenance operations of a gas turbine engine.

Figure 1:
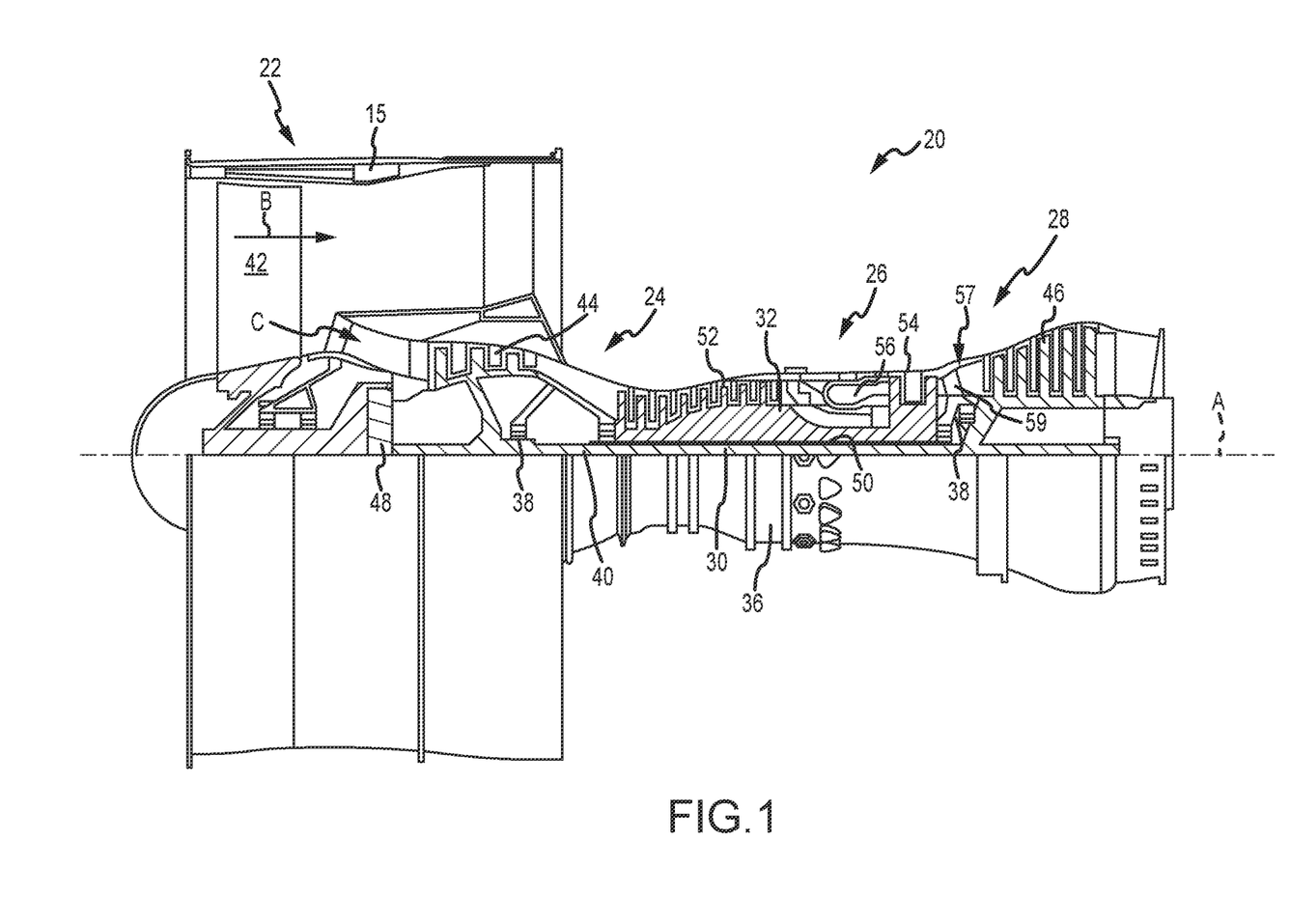
FIG. 1 is an axial cross-sectional view, respectively, of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
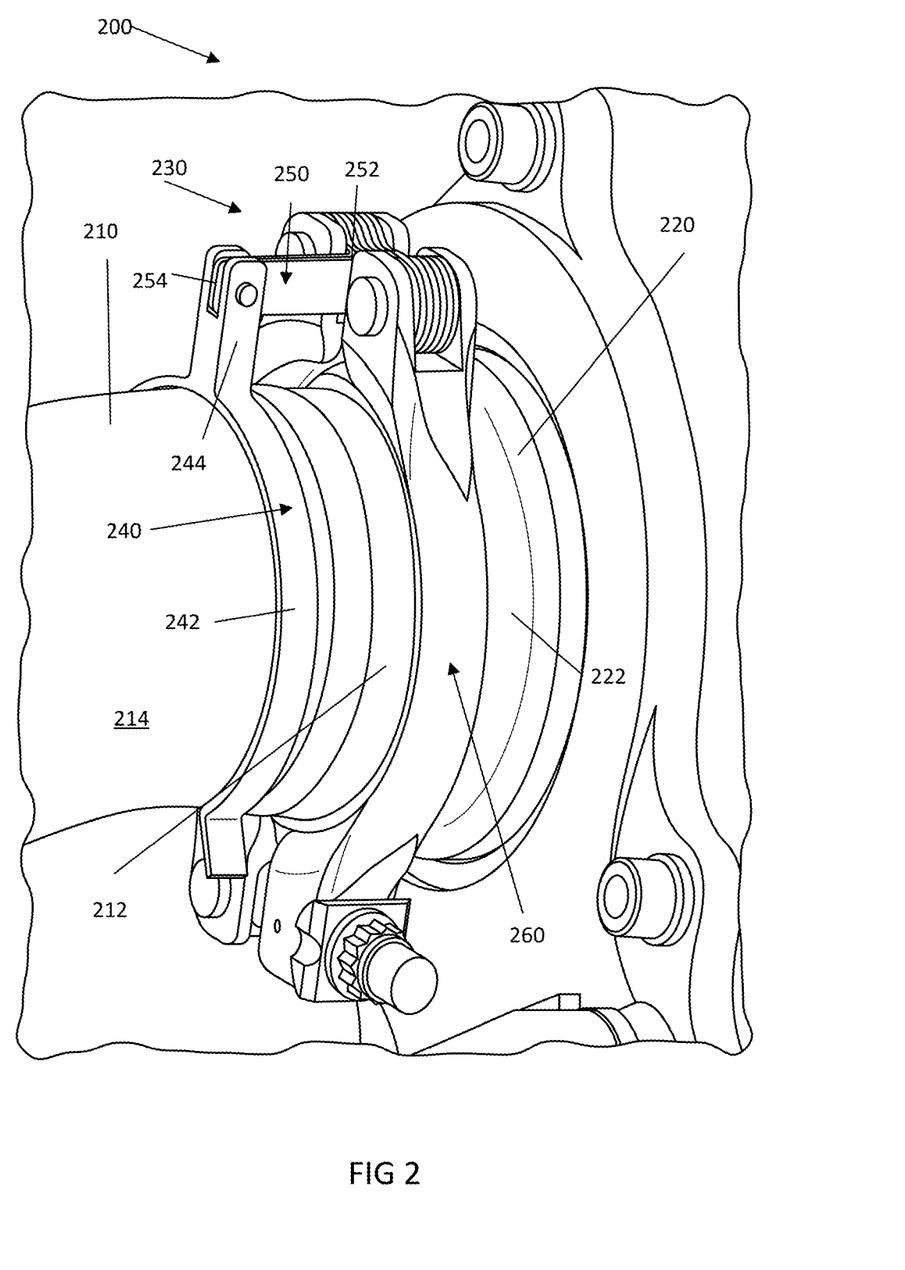
FIG. 2 illustrates a tubing system, in accordance with various embodiments.

With reference to FIG. 2, a tubing system in a gas turbine engine is shown, in accordance with various embodiments. Tubing system 200 may provide various fluids (e.g., air, oil, fuel, hydraulic, etc.) to components in various compartments in gas turbine engine 20 in FIG. 1. For example, with momentary combined reference to FIGS. 1 and 2, tubing system 200 may provide bleed air from the compressor section (44,52) to the nacelle.

In various embodiments, a tubing system 200 may include a first tube 210 having a first tube end 212 and a second tube 220 having a second tube end 222. The first tube end 212 may be coupled to the second tube end 222 by a clamp assembly 230. The clamp assembly 230 may include a sleeve 240 having a semi-annular portion 242 and a clevis 244. The semi-annular portion 242 of the sleeve 240 may be coupled to the first tube 210 on an outer surface 214 of the first tube 210. The connection of the sleeve 240 to the first tube 210 may be fixed or removable.

In various embodiments, the sleeve 240 is fixedly connected to the first tube 210 by brazing, or any other method known in the art. In various embodiments, the sleeve 240 is connected to the first tube 210 by a retaining component that retains the clamp assembly in place but may be removable from the first tube 210. The clamp assembly 230 may further include a bracket assembly 250 having a first bracket end 252 and a second bracket end 254. The bracket assembly may be a single machined piece or multiple sheet metal brackets. The second bracket end 254 may be coupled to the clevis 244 via a fastener, a pin, or any other connection method known in the art. The clamping band 260 may be configured to join the first tube end 212 of the first tube 210 to the second tube end 222 of the second tube 220.

In various embodiments, first tube 210 and second tube 220 may comprise a high temperature metal (e.g., an austenitic nickel-chromium-based alloy such as that available under the trade name INCONEL), a high temperature composite, and/or the like. In various embodiments, first tube 210 and second tube 220 may comprise a high temperature stainless steel (e.g., type 330 stainless steel). Similarly, the sleeve 240 may comprise a high temperature metal that is similar, or the same as first tube 210. In various embodiments, a similar first tube 210 material and sleeve 240 material may ensure effective brazing in a fixedly attached configuration.

Figure 3:
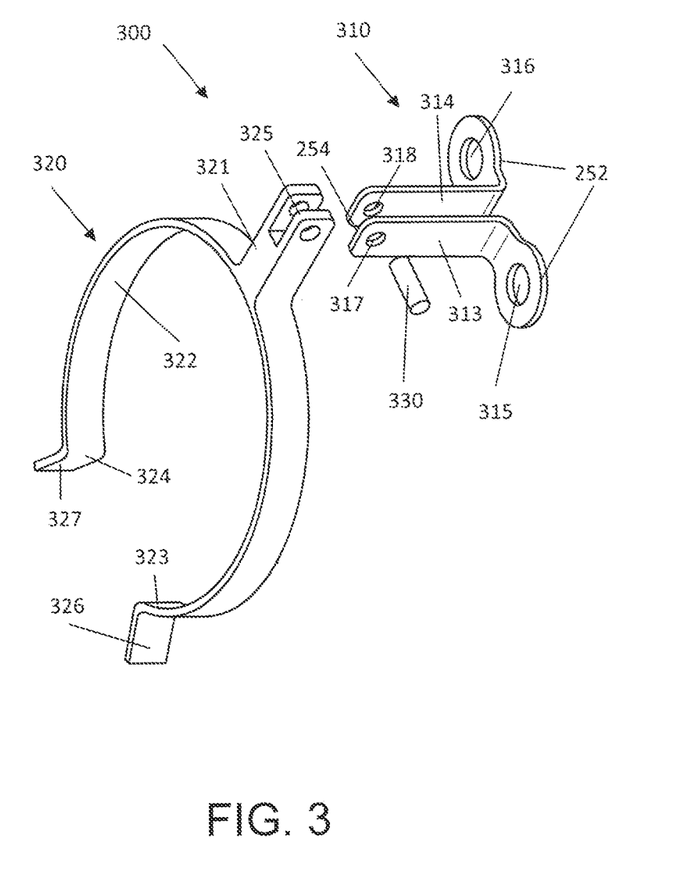
FIG. 3 illustrates an exploded view of a retaining assembly, in accordance with various embodiments.

With reference now to FIG. 3, an exploded view of a retaining assembly 300, in accordance with various embodiments is illustrated. The retaining assembly 300 may comprise a bracket assembly 310 and a retention component 320. The bracket assembly 310 may comprise the first bracket end 252 and the second bracket end 254. The first bracket end 252 of the bracket assembly 310 may comprise a first mounting point 315 and a second mounting point 316. The mounting points (315, 316) may be configured to mount to a clamping band 260. Although described with a clamping band assembly, the bracket assembly 310 could be configured to mount to any component that may become loose, lost, or misplaced during maintenance operations on a gas turbine engine. The bracket assembly 310 may further comprise a first L-bracket 313 and a second L-bracket 314. Each bracket (313,314) may be a single bend sheet metal bracket of standard thickness, such as 0.00625"-0.25", more preferably 0.025"-0.125", even more preferably 0.05"-

0.09375". In various embodiments, bracket assembly 310 may be a single, monolithic machined component. The second bracket end 254 of the bracket assembly 310 may comprise a first pin aperture 317 and a second pin aperture 318. The pin apertures (317, 318) may be aligned with a bracket end 321 of the retention component 320 and couple the bracket assembly 310 to the retention component 320.

In various embodiments, the retention component 320 may comprise a bracket end 321, a semi-annular portion 322, a first retention end 323 and a second retention end 324. The semi-annular portion may be greater than 180 degrees from the first retention end 323 to the second retention end 324 and correspond to an outer diameter of a tube. The first retention end 323 may comprise first lip portion 326 and the second retention end 324 may comprise a second lip portion 327, the lip portions (326, 327) being configured to allow easy installation on a tube, as well as easy removal from a tube. The semi-annular portion 322 may be flexible and configured to expand when being installed and apply a retention force once installed on a tube. This retention force will allow the retention component 320 to hold the bracket assembly 310 and a clamping band during in line maintenance of a gas turbine engine.

In various embodiments, bracket assembly 310 and retention component 320 may comprise a high temperature metal (e.g., an austenitic nickel-chromium-based alloy such as that available under the trade name INCONEL), a high temperature composite, and/or the like. In various embodiments, bracket assembly 310 and retention component 320 may comprise a high temperature stainless steel (e.g., type 330 stainless steel). Bracket assembly 310 and retention component 320 may have similar, or dissimilar materials.

In various embodiments, the bracket end 321 of the retention component 320 may comprise a clevis 325. The clevis 325 may align with the pin apertures (317, 317) of the bracket assembly 310 and a pin 330 may fasten the bracket assembly 310 to the retention component 320. Although a pin 330 is depicted, the connection could be made by any fastening means known in the art, such as a bolt and nut, a rivet, a screw, etc. The pin 330 may form a fulcrum, about which the bracket assembly may rotate with respect to the retention component 320 when the retention component is fixed. The bracket assembly being able to rotate about the fulcrum may allow the retention component to remain fixed on a tube during maintenance operations and allow an otherwise loose external component (such as a clamping band) mounted to the bracket to remain attached to a gas turbine engine during maintenance to prevent losing or misplacing the component.

Figure 4:
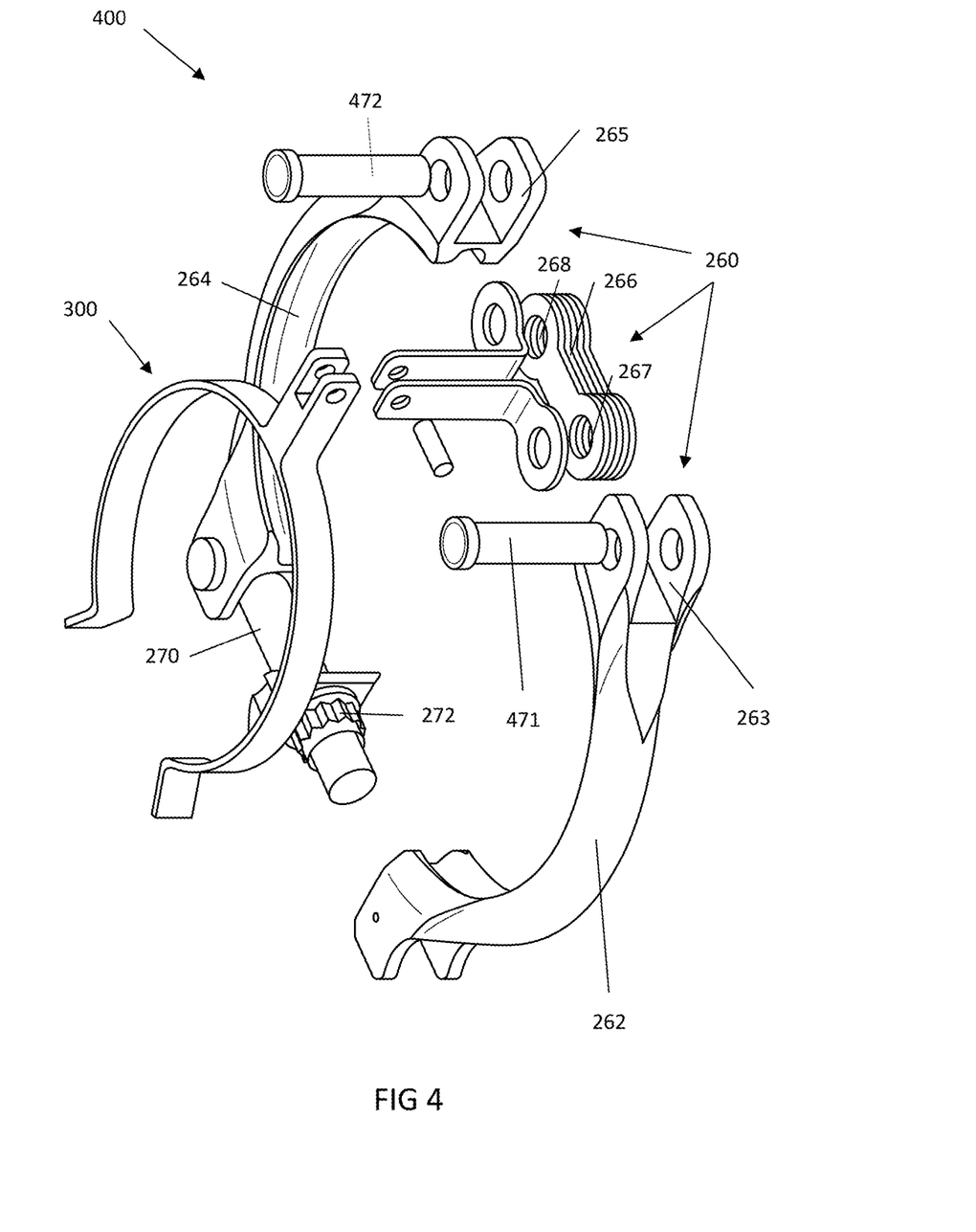
FIG. 4 illustrates an exploded view of a clamp assembly, in accordance with various embodiments.

With reference now to FIG. 4, an exploded view of a clamp assembly, in accordance with various embodiments is illustrated. A clamp assembly 400 may comprise a clamping band 260 and a retaining assembly 300, as shown in FIG. 3. The clamping band 260 may further comprise a first clamping arm 262, a second clamping arm 264, a hinge connector 266, a bolt 270 coupled to the second clamping arm 264, and a nut 272 coupled opposite the connection between the second clamping arm 264 and the bolt 270. When in an assembled position, the first clamping arm 262 and the second clamping arm 264 compress a flange from a first tube with a flange from a second tube and connecting the tubes together. Although a nut 272 and bolt 270 connection is depicted, and clamping band connection known in the art could be utilized, such as a quick release latch, a T-bolt latch, etc. Both the first clamping arm 262 and the second clamping arm 264 may have a clevis (263, 265). Each clevis (263, 265) may correspond to respective apertures (267, 268) on hinge connector 266 and the mounting points (315, 316) of the bracket assembly 310. The bracket assembly 310 may be mounted to the clamping band 260 by aligning the mounting points (315, 316) with the devises (263, 265) and the apertures (267, 268) in the hinge connector 266, and placing pins (471,472) through the stacks.

Figure 5:
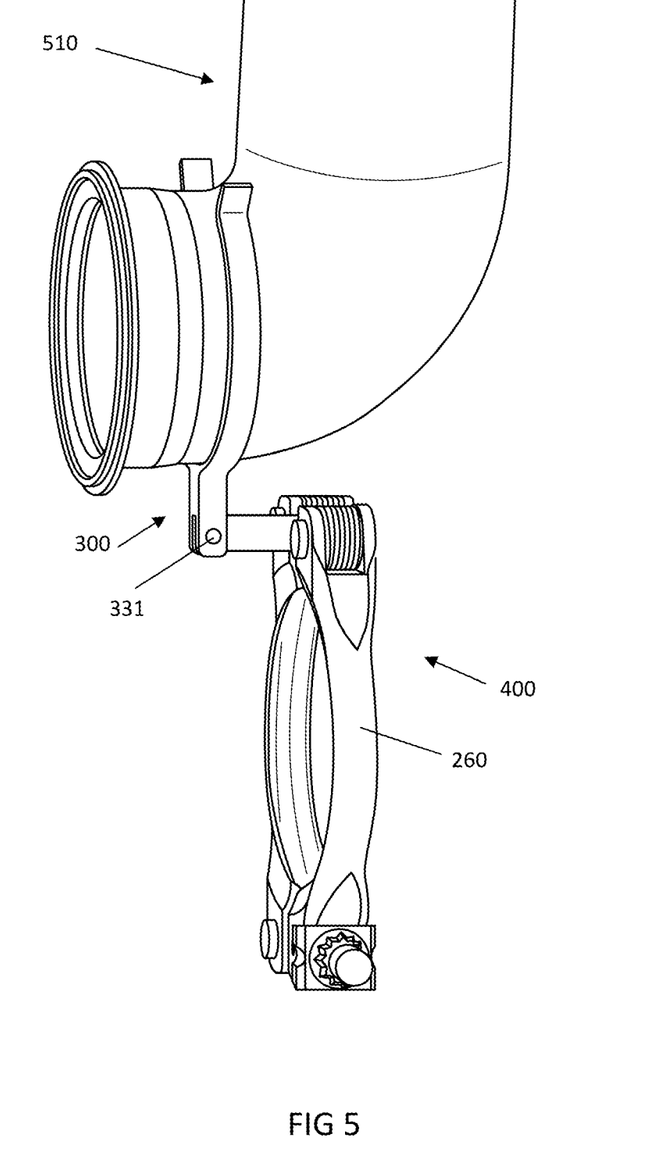
FIG. 5 illustrates a clamp assembly in use, in accordance with various embodiments.

With reference now to FIG. 5, a clamp assembly 400 in use during maintenance on a gas turbine engine is depicted. This may fix the clamping band 260 to the retaining assembly 300, so an otherwise loose external component (the clamping band 260) may be retained on a fixed component (a tube 510) and rotated about the fulcrum 331 of the retaining assembly 300 to move the clamping band 260 out of the way from maintenance, and to fix the clamping band 260 in place to ensure it is not misplaced or lost.

Although described herein with respect to tubing systems corresponding to bleed air systems, the clamping assembly and retaining assembly may be used with any other suitable connection such as fuel tube connections, lubrication return tube connections, hydraulic tube connections, and the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clamp assembly, comprising:
a clamping band; and
a retaining assembly, comprising:
  a bracket assembly having a first end coupled to the clamping band and a second end; and
  a retention component comprising at least one of a spring loaded clip or a spring loaded clamp, the retention component having a clevis coupled to the second end of the bracket assembly, wherein the bracket assembly comprises a first L-bracket having a first hinge aperture and a second L-bracket having a second hinge aperture.

2. The clamp assembly of claim 1, wherein the clevis and the second end define a fulcrum, the clamping band being able to rotate via the bracket assembly about the fulcrum.

3. The clamp assembly of claim 1, wherein the retention component comprises at least one of a worm gear or a fastener configured to either loosen or tighten the retention component.

4. The clamp assembly of claim 1, wherein a first clamping arm of the clamping band is coupled to the first L-bracket and configured to pivot about a first hinge and a second clamping arm of the clamping band is coupled to the second L-bracket and configured to pivot about a second hinge.

5. A gas turbine engine, comprising:
a first tube assembly comprising:
  a tube having a straight portion having an outer surface;
  a clamp assembly comprising a sleeve having a semi-annular portion, a clevis, and a bracket assembly having a first end and a second end, the sleeve being coupled at the semi-annular portion to the outer surface of the straight portion, the bracket assembly being coupled to the sleeve at an intersection of the second end and the clevis.

6. The gas turbine engine of claim 5, wherein the intersection defines a fulcrum about which the first end of the bracket assembly is configured to rotate.

7. The gas turbine engine claim 5, wherein the clamp assembly further comprises a clamping band coupled to the first end of the bracket assembly.

8. The gas turbine engine of claim 5, wherein the semi-annular portion of the sleeve is fixedly attached via brazing to the outer surface of the straight portion of the first tube assembly.

9. The gas turbine engine of claim 7, wherein the bracket assembly comprises a first L-bracket having a first hinge aperture and a second L-bracket having a second hinge aperture.

10. The gas turbine engine of claim 9, wherein a first clamping arm of the clamping band is coupled to the first L-bracket and configured to pivot about a first hinge and a second clamping arm of the clamping band is coupled to the second L-bracket and configured to pivot about a second hinge.

11. The gas turbine engine of claim 7, further comprising a second tube assembly coupled to the first tube assembly by the clamping band.

12. A clamp assembly, comprising:
a clamping band; and
a retaining assembly, comprising:
  a bracket assembly having a first end coupled to the clamping band and a second end; and
  a retention component comprising at least one of a chain or a band/strap, the retention component having a clevis coupled to the second end of the bracket assembly, wherein the bracket assembly comprises a first L-bracket having a first hinge aperture and a second L-bracket having a second hinge aperture.

* * * * *